(12) United States Patent
Tsuji

(10) Patent No.: US 7,680,418 B2
(45) Date of Patent: Mar. 16, 2010

(54) MULTI-RATE CLOCK SIGNAL EXTRACTING METHOD AND MULTI-RATE CLOCK SIGNAL EXTRACTING DEVICE

(75) Inventor: Hiromi Tsuji, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 716 days.

(21) Appl. No.: 11/512,344

(22) Filed: Aug. 30, 2006

(65) Prior Publication Data

US 2007/0047970 A1 Mar. 1, 2007

(30) Foreign Application Priority Data

Sep. 1, 2005 (JP) ............................. 2005-252992

(51) Int. Cl.
*H04B 10/04* (2006.01)
(52) U.S. Cl. ..................... 398/155; 398/154; 375/355; 375/356
(58) Field of Classification Search ................. 398/155
See application file for complete search history.

(56) References Cited

U.S. PATENT DOCUMENTS

| | | | | |
|---|---|---|---|---|
| 5,557,443 | A * | 9/1996 | Nakamura et al. | 398/30 |
| 6,178,212 | B1 * | 1/2001 | Akashi | 375/355 |
| 6,694,104 | B1 * | 2/2004 | Caplan et al. | 398/197 |
| 6,931,213 | B2 * | 8/2005 | Desurvire | 398/175 |
| 7,039,323 | B2 * | 5/2006 | Jong et al. | 398/155 |
| 7,099,582 | B2 * | 8/2006 | Belhadj-Yahya et al. | 398/27 |
| 7,277,643 | B2 * | 10/2007 | Baba et al. | 398/155 |
| 2001/0046076 | A1 * | 11/2001 | Kim et al. | 359/124 |
| 2002/0027695 | A1 * | 3/2002 | Kim et al. | 359/189 |
| 2002/0033978 | A1 * | 3/2002 | Lee et al. | 359/128 |
| 2003/0002112 | A1 * | 1/2003 | Hirano et al. | 359/161 |
| 2003/0020985 | A1 * | 1/2003 | LaGasse et al. | 359/135 |
| 2003/0091001 | A1 | 5/2003 | Watanabe | |
| 2003/0118349 | A1 * | 6/2003 | Ohara et al. | 398/154 |
| 2005/0018271 | A1 * | 1/2005 | Hu et al. | 359/247 |
| 2006/0056853 | A1 * | 3/2006 | Hu et al. | 398/155 |
| 2006/0093375 | A1 * | 5/2006 | Futami et al. | 398/155 |

FOREIGN PATENT DOCUMENTS

JP 2003-152786 5/2003

* cited by examiner

*Primary Examiner*—Ken N Vanderpuye
*Assistant Examiner*—Tanya Ngo
(74) *Attorney, Agent, or Firm*—Rabin & Berdo, P.C.

(57) ABSTRACT

A multi-rate clock signal extracting device includes a light modulator, a photoelectric converter, a band-pass filter unit, a phase comparison unit, a bit rate changeover switch and a modulating electric signal generating unit. The light modulator modulates a light signal according to a modulating electric signal as a mixing signal obtained by mixing an electric signal with frequency $f/(2^{j-1})$ and an electric signal with frequency $\Delta f$ so as to output it as a modulated light signal. The modulated light signal is converted into a first electric signal by the photoelectric converter. A second electric signal group with frequency $(2^{n-1}) \times \Delta f$ is generated from signal components with frequencies $(2^{n-1}) \times \Delta f$ included in the modulated light signal by the photoelectric converter and the band-pass filter unit so as to be input into the phase comparison unit. The bit rate changeover switch selects an electric signal corresponding to the bit rate of the light signal so as to input it into a modulating electric signal generating unit. The modulating electric signal generating unit outputs the modulating electric signal.

6 Claims, 4 Drawing Sheets

MULTI-RATE CLOCK SIGNAL EXTRACTING METHOD AND MULTI-RATE CLOCK SIGNAL EXTRACTING DEVICE

BACKGROUND OF THE INVENTION

1. Field of the Invention

The present invention relates to a method and a device that extract a clock signal from a light signal. Particularly, the invention relates to the method and the device that are capable of extracting clock signals from light signals according to a plurality of light signals with different bit rates.

2. Description of Related Art

Conventionally, the type of a bit rate of a light signal that transmits through an optical communication network is fixed to one type in advance. An optical transmitting/receiving device, a route switching device, a light signal inserting/branching device, a light signal waveform shaping device, a wavelength converting device and the like composing the optical communication network are generally formed as a device exclusive to bit rate. That is, for example, in order to transmit a light signal of 10 Gbit/s via an optical communication network with bit rate of 2.5 Gbit/s, it is necessary to make some efforts for the system of signal transmission to work.

As one example of such efforts, the following method will be described. That is, in an optical communication network which is designed so as to have bit rate of 2.5 Gbit/s, when a light signal with bit rate of 10 Gbit/s is transmitted, the light signal is branched into four light signals with bit rate of 2.5 Gbit/s, so that the branched signals are transmitted separately. What the light signal with high bit rate is branched so as to be converted into light signals with low bit rate is occasionally called as down-converting.

In order to transmit the branched four light signals individually through an optical transmission path, for example, wavelength multiplex transmission is performed. That is, optical carrier waves with different wavelengths are allocated to the branched light signals with bit rate of 2.5 Gbit/s, respectively, so that the wavelength division multiplex transmission is performed. The light signals are restored to the light signal with bit rate of 10 Gbit/s on a receiving side.

In order to down-convert the light signal with high bit rate so as to transmit it, it is necessary that the branched light signals can be restored to the original light signal with high bit rate on the receiving side. It is necessary to superimpose a control signal requiring for the restoration on the light signal on a transmission side and transmit the superimposed signal. That is, since data such as a control signal to be newly transmitted are added to data of a light signal to be originally transmitted, the total amount of data to be transmitted becomes large. Since transmission signals with low bit rate which are down-converted to be generated arrive with differential time delay on the receiving side, it is necessary to correct the differential time delay between the signals.

According to the method of converting the light signal with high bit rate into the light signals with low bit rate and transmitting them, the control signal for generating the original light signal with high bit rate is also required, and a correcting step or the like for the difference in arrival time of the light signals with low bit rate is required. For this reason, the method of transmission is complicated and the configuration of the device becomes complicated.

In conventional optical communication networks, therefore, light signals are divided according to bit rates, and light relay systems corresponding to the exclusive bit rates are used. Such a process is executed using a communication path control system. That is, systems which are configured of devices which cannot accept changeability of the bit rates of the light signals have basically utilized for the light relay systems in the conventional optical communication networks.

In the future, however, in order to use a limited optical communication path effectively, it is assumed that a system for transmitting light signals with different bit rates through a common optical transmission path would be adopted. In order to realize this, it is assumed that the following communication system would be realized. That is, in optical networks composing future optical communication networks, for example, an information processing unit relating to communication management such as path switching (hereinafter, occasionally called as "management plane") is realized by an electric unit. Information relating to the bit rates of the light signals propagating through an optical transmission path is input into the management plane in advance. In the management plane, while searching for the information on the bit rate of the light signal propagating through the transmission path, the route of the optical network is switched or configured.

In order to realize the system which is capable of transmitting light signals with different bit rates through a common optical transmission path, it is necessary to introduce not a single bit rate-specific device but a device which can operate for a plurality of bit rates as a light transmitting/receiving device, a route switching device, a light signal inserting/branching device, a light signal waveform shaping device, a wavelength converting device and the like composing the optical communication network.

It is, therefore, an object of the present invention to provide a clock signal extracting method which is capable of extracting a clock signal even if a light signal with any bit rate is received according to a plurality of light signals with different bit rates to be received, and a device which realizes the method.

Concretely, a first object is to provide a method of being capable of extracting a clock signal on a receiving side according to a bit rate notified via a management plane in advance prior to the start of communication, and a device which realizes the method.

A second object is to provide a method of detecting a bit rate of a light signal received on a receiving side and a device which realizes the method.

A third object is to provide a method of being capable of detecting a bit rate of a light signal received on a receiving side and extracting a clock signal according to the bit rate, and a device which realizes the method.

SUMMARY OF THE INVENTION

In order to achieve the above objects, a multi-rate clock signal extracting method of a first invention includes a light modulating step, a photoelectric converting step, a first band-pass step, a phase comparing step, a bit rate changeover step, and a modulating electric signal generating step.

At the light modulating step, a light signal is modulated according to a modulating electric signal obtained by mixing an electric signal with frequency $f/(2^{j-1})$ being $1/(2^{j-1})$ of a maximum bit rate frequency f of the receivable light signal (j is an integer of 1 or more) and an electric signal with frequency $\Delta f$ so as to be output as a modulated light signal.

At the photoelectric converting step, the modulated light signal is converted into a first electric signal.

At the first band-pass step, j electric signal components with frequencies $(2^{n-1})\times\Delta f$ (n is positive integers from 1 to j)

are extracted from the first electric signal so as to be output as a second electric signal group in parallel.

At the phase comparing step, phases of electric signals with equal frequencies are compared between a second electric signal group with frequencies $(2^{n-1}) \times \Delta f$ and a third electric signal group with j frequencies $(2^{n-1}) \times \Delta f$ generated by multiplying a reference signal with frequency $\Delta f$ generated from a reference signal generator by $2^{n-1}$, so that a group of j difference components is output as a fourth electric signal group in parallel.

At the bit rate changeover step, one fourth electric signal is selected from the fourth electric signal group so as to be output.

At the modulating electric signal generating step, the selected fourth electric signal is input so that the modulating electric signal is generated.

The multi-rate clock signal extracting method of the first invention can be realized by a multi-rate clock signal extracting device that includes a light modulator, a photoelectric converter, a band-pass filter unit, a phase comparison unit, a bit rate changeover switch, and a modulating electric signal generating unit. The light modulating step, the photoelectric converting step, the first band-pass step, the phase comparing step, the bit rate changeover step and the modulating electric signal generating step can be realized by the light modulator, the photoelectric converter, the band-pass filter unit, the phase comparison unit, the bit rate changeover switch, and the modulating electric signal generating unit, respectively.

The modulating electric signal generating step preferably includes a smoothing step, a reference clock signal generating step, a reference signal generating step, a mixing step and a second band-pass step.

At the smoothing step, the selected fourth electric signal is smoothened and converted into a fifth electric signal so that the fifth electric signal is output.

At the reference clock signal generating step, the fifth electric signal is input so that a reference clock signal with frequency $f/(2^{j-1})$ corresponding to the minimum bit rate receivable as the bit rate of the light signal is generated.

At the reference signal generating step, a reference signal with frequency $\Delta f$ is generated.

At the mixing step, the reference clock signal and the reference signal are mixed so that a mixing electric signal as a sum frequency signal or a difference frequency signal of both frequencies of the reference clock signal and the reference signal is output.

At the second band-pass step, the mixing electric signal is filtered so that a modulating electric signal as any one of electric signal components with frequencies $((f/2^{j-1})+\Delta f)$ and $((f/2^{j-1})-\Delta f)$ is output.

The modulating electric signal generating step is realized by the modulating electric signal generating unit. The modulating electric signal generating unit includes a loop filter, a reference clock signal generator, a reference signal generator, a mixer, and a band-pass filter.

The smoothing step, the reference clock signal generating step, the reference signal generating step, the mixing step, and the second band-pass step are realized by the loop filter, the reference clock signal generator, the reference signal generator, the mixer, and the band-pass filter, respectively.

A bit rate detecting method of a second invention includes a light modulating step, a photoelectric converting step, a first band-pass step, a modulating electric signal generating step, a second electric signal intensity detecting step, and a bit rate detecting step. The light modulating step, the photoelectric converting step, and the first band-pass step are the same as the steps of the multi-rate clock signal extracting method of the first invention.

At the modulating electric signal generating step, a modulating electric signal is generated independently. The modulating electric signal generating step of the multi-rate clock signal extracting method of the first invention is the step of inputting the fourth electric signal so as to generate the modulating electric signal. However, the modulating electric signal generating step of the bit rate detecting method of the second invention does not require an electric signal corresponding to the fourth electric signal.

At the second electric signal intensity detecting step, intensities of j second electric signals composing the second electric signal group are detected.

At the bit rate detecting step, intensity values (reference values) of the j second electric signals measured for light signals with j bit rates assumed in advance are compared with the intensity values of the j second electric signals output at the second electric signal intensity detecting step. Combinations of matched reference values and intensity values are found. Bit rates corresponding to the matched reference values are determined to be detected as the bit rates of the received light signals.

The bit rate detecting method of the second invention can be realized by a bit rate detecting device that includes a light modulator, a photoelectric converter, a band-pass filter unit, a modulating electric signal generating unit, an intensity detecting unit, and a bit rate detecting unit. The light modulating step, the photoelectric converting step, the first band-pass step, the modulating electric signal generating step, the second electric signal intensity detecting step, and the bit rate detecting step can be realized by the bit rate detecting device that includes the light modulator, the photoelectric converter, the band-pass filter unit, the modulating electric signal generating unit, the intensity detecting unit, and the bit rate detecting unit, respectively.

The modulating electric signal generating step preferably includes a reference clock signal generating step, a reference signal generating step, a mixing step, and a second band-pass step.

At the reference clock signal generating step, a reference clock signal with frequency $f/(2^{j-1})$ corresponding to the minimum bit rate receivable as the bit rate of the light signal is generated.

At the reference signal generating step, a reference signal with frequency $\Delta f$ is generated.

At the mixing step, the reference clock signal and the reference signal are mixed so that a mixing electric signal as a sum frequency signal or a difference frequency signal of both frequencies of the reference clock signal and the reference signal is output.

At the second band-pass step, the mixing electric signal is filtered so that a modulating electric signal as any one of electric signal components with frequencies $((f/2^{j-1})+\Delta f)$ and $((f/2^{j-1})-\Delta f)$ is output.

The modulating electric signal generating step is realized by the modulating signal generating unit including the reference clock signal generator, the reference signal generator, the mixer, and the band-pass filter. The reference clock signal generating step, the reference signal generating step, the mixing step, and the second band-pass step are realized by the reference clock signal generator, the reference signal generator, the mixer, and the band-pass filter, respectively.

A multi-rate clock signal extracting method of the third invention includes a light modulating step, a photoelectric converting step, a first band-pass step, a second electric signal intensity detecting step, a bit rate detecting step, a phase comparing step, a bit rate changeover step, and a modulating electric signal generating step.

The light modulating step, the photoelectric converting step, the first band-pass step, the phase comparing step, and the bit rate changeover step are the same as the steps of the multi-rate clock signal extracting method of the first invention.

The second electric signal intensity detecting step and the bit rate detecting step are the same as the steps of the bit rate detecting method of the second invention.

At the modulating electric signal generating step, the selected fourth electric signal is input, and a modulating electric signal is generated so as to be output.

The multi-rate clock signal extracting method of the third invention can be realized by the multi-rate clock signal extracting device that includes the light modulator, the photoelectric converter, the band-pass filter unit, the intensity detecting unit, the bit rate detecting unit, the phase comparison unit, the bit rate changeover switch, and the modulating electric signal generating unit. The light modulating step, the photoelectric converting step, the first band-pass step, the second electric signal intensity detecting step, the bit rate detecting step, the phase comparing step, the bit rate changeover step, and the modulating electric signal generating step can be realized by the light modulator, the photoelectric converter, the band-pass filter unit, the intensity detecting unit, the bit rate detecting unit, the phase comparing unit, the bit rate changeover switch, and the modulating electric signal generating unit, respectively.

The modulating electric signal generating step preferably includes a smoothing step, a reference clock signal generating step, a reference signal generating step, a mixing step, and a second band-pass step. These steps are the same as the steps of the multi-rate clock signal extracting method of the first invention. The modulating electric signal generating step can be realized by the modulating electric signal generating unit including a loop filter, a reference clock signal generator, a reference signal generator, a mixer, and a band-pass filter.

According to the multi-rate clock signal extracting method of the first invention, the fourth electric signal corresponding to the bit rate notified in advance prior to the start of communication can be selected at the bit rate changeover step. As a result, a clock signal can be extracted according to the bit rate notified in advance via a management plane prior to the start of communication.

The fourth electric signal group is output from the phase comparator as a result of comparing phases of the electric signals with equal frequencies between a second electric signal group extracted from a first electric signal and a third electric signal group generated based on a reference signal generated by the reference signal generator. The fourth electric signals composing the fourth electric signal group are, therefore, correspond to the bit rates of the light signals assumed to be received one by one.

That is, in the case where a bit rate of the received light signal is a maximum bit rate assumed in the multi-rate clock signal extracting method of the first invention, the bit rate corresponds to the fourth electric signal which is output by comparing the phases of the electric signals with frequencies $(2^{j-1}) \times \Delta f$ in the electric signals composing the second and third electric signal groups. In the case where a bit rate of the received light signal is ½ of the assumed maximum bit rate, the bit rate corresponds to the fourth electric signal which is output by comparing the phases of the electric signals with frequencies $(2^{j-2}) \times \Delta f$ in the electric signals composing the second and third electric signal groups.

In general, in the case where a bit rate of the received light signal is $½^{j-k}$ of the assumed maximum bit rate, the bit rate corresponds to the fourth electric signal which is output by comparing the phases of the electric signals with frequencies $(2^{k-1}) \times \Delta f$ (k is a positive integer in the range from 1 to j) in the electric signals composing the second and third electric signal groups.

Therefore, in the case where a bit rate notified in advance prior to the start of communication is $½^{j-k}$ of the assumed maximum bit rate, the bit rate changeover switch is set, so that the fourth electric signals which are output by comparing the second and third electric signals with frequencies $(2^{k-1}) \times \Delta f$ are selected. As a result, the clock signal can be correctly extracted.

According to the bit rate detecting method of the second invention, the bit rate of the received light signal is detected at the bit rate detecting step. As a result, the bit rate of the light signal received on the receiver side can be detected.

The bit rate of the received light signal can be detected by the bit rate detecting method of the second invention in such a manner that the following processes are executed.

The details will be mentioned later, but in the bit rate detecting method of the second invention, an initial value setting process, a measured value acquiring process, a bit rate determining process and a bit rate information output process can be executed.

At the initial value setting process, the following is executed. That is, a first false electric signal is generated from false light signals of j bit rate assumed in advance by the light modulator and the photoelectric converter (the light modulating step and the photoelectric converting step) so as to be input into the band-pass filter unit. The intensity of a second false electric signal group output from the band-pass filter unit (first band-pass step) is measured (second electric signal intensity detecting step), so as to be acquired as a reference value.

Next, the measured value acquiring process is executed. At the measured value acquiring process, a first electric signal is generated from the actually received light signal by the light modulator and the photoelectric converter (light modulating step and the photoelectric converting step) so as to be input into the band-pass filter unit. The intensity of the second electric signal group output from the band-pass filter unit (first band-pass step) is measured (second electric signal intensity detecting step).

At the bit rate determining process, the intensity of the second false electric signal group is compared with the intensity of the second electric signal group, and a value of the frequency $(2^{n-1}) \times \Delta f$ of the matched second electric signals is determined. As a result, the value of the bit rate of the received light signal is detected. That is to say, when the value n is determined, the value of the frequency $(2^{n-1}) \times \Delta f$ is decided. For this reason, the bit rate corresponding to the frequency can be decided as the bit rate of the received light signal.

Bit rate information is output from the bit rate detecting unit according to the value of the decided bit rate. For example, a voltage value is set in advance according to the bit rate, and the voltage value corresponding to the decided bit rate is output as the bit rate information from the bit rate detecting unit.

According to the multi-rate clock signal extracting method of the third invention, a bit rate of the received light signal is determined at the bit rate detecting step. The bit rate information is output from the bit rate detecting unit according to the value of the determined bit rate so as to be capable of being supplied to the bit rate changeover switch. The fourth electric signal corresponding to the bit rate of the received light signal is selected by means of the bit rate changeover switch so as to be capable of being supplied to the modulating electric signal generating unit. As a result, the bit rate of the received light signal is detected, and the clock signal can be extracted according to the bit rate.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENT

Figure 1:
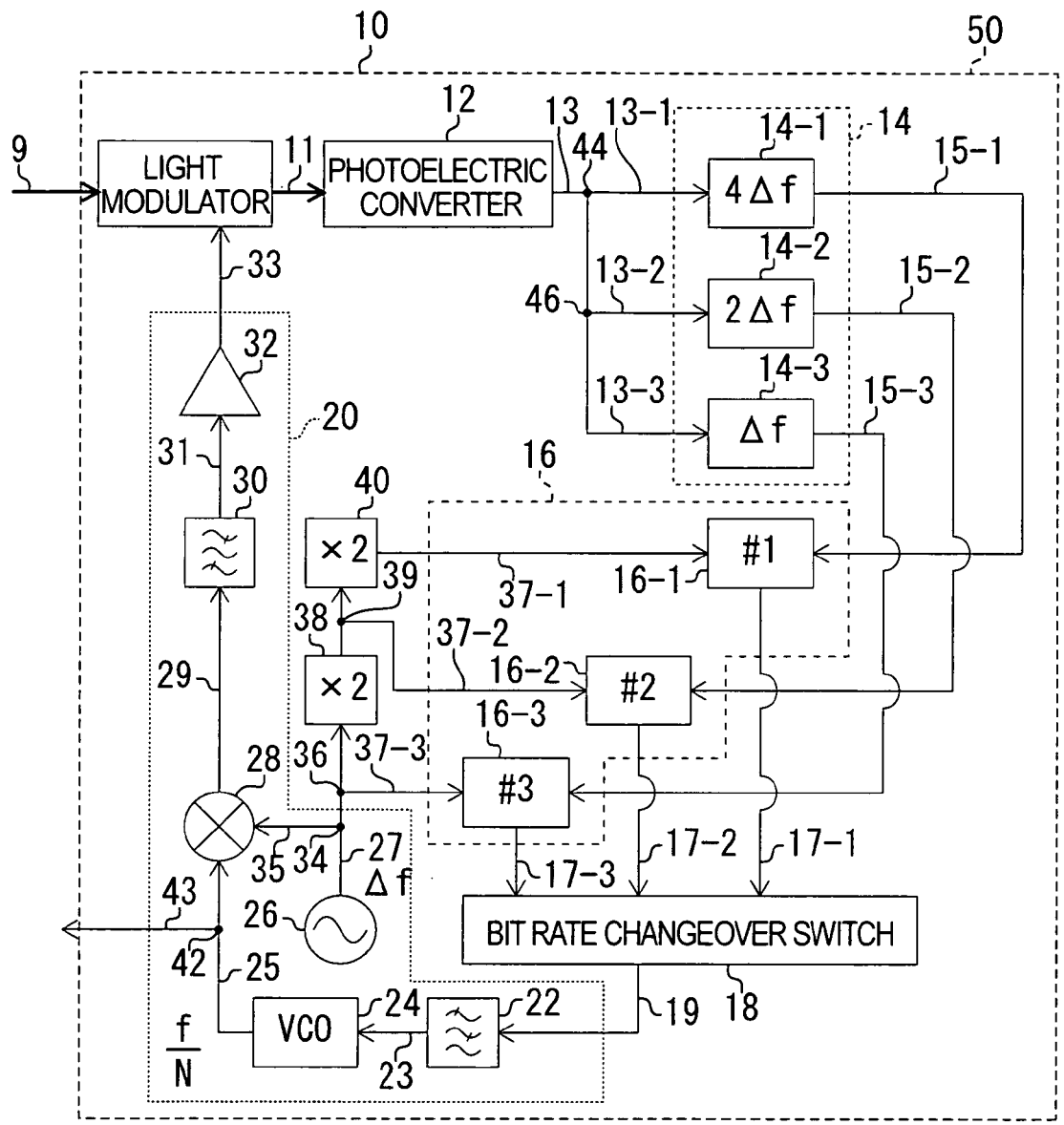
FIG. 1 is a schematic block diagram illustrating a multi-rate clock signal extracting device according to a first embodiment.
Figure 2:
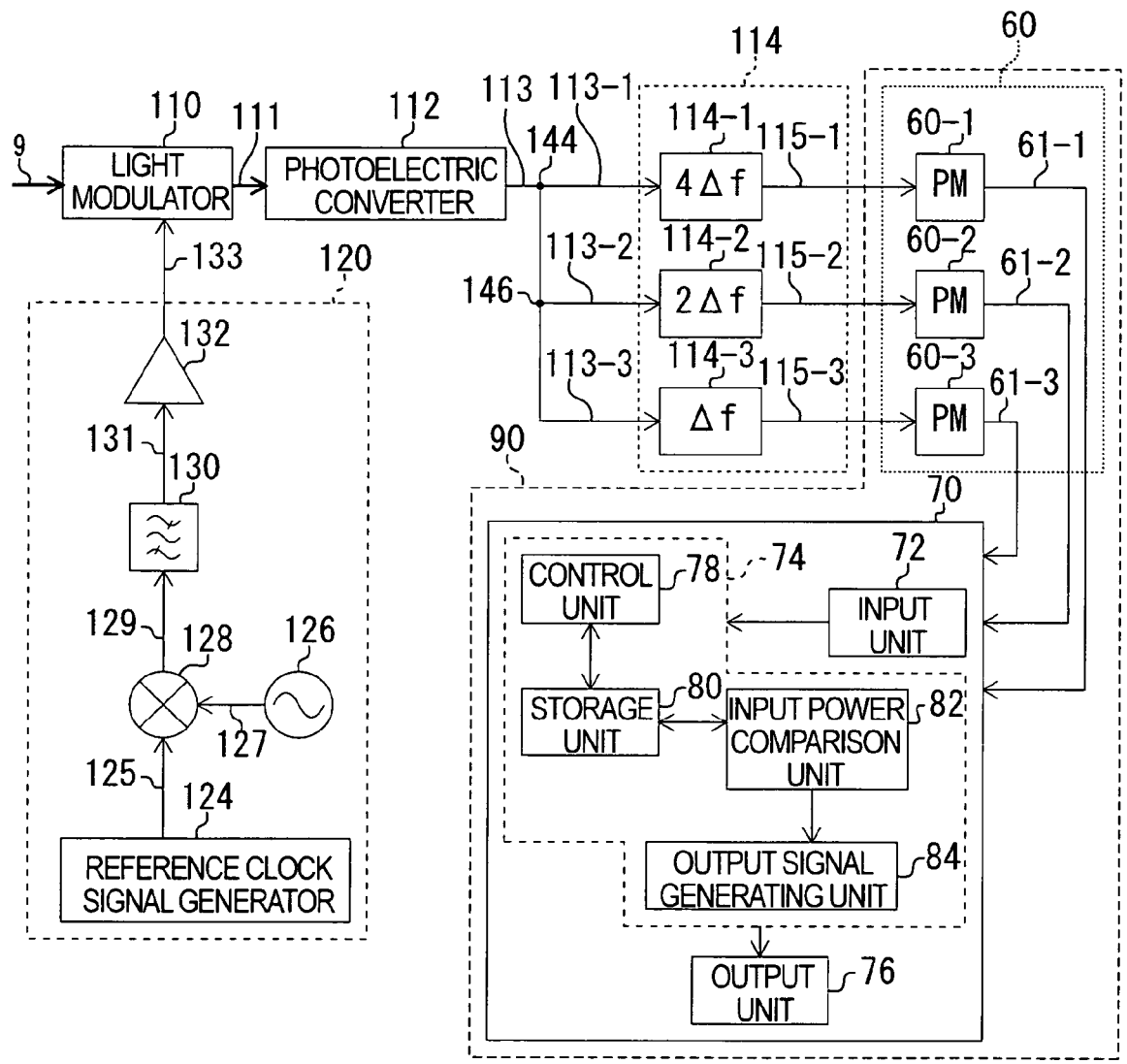
FIG. 2 is a schematic block diagram for explaining a bit rate detecting device and its operation according to a second embodiment.
Figure 3:
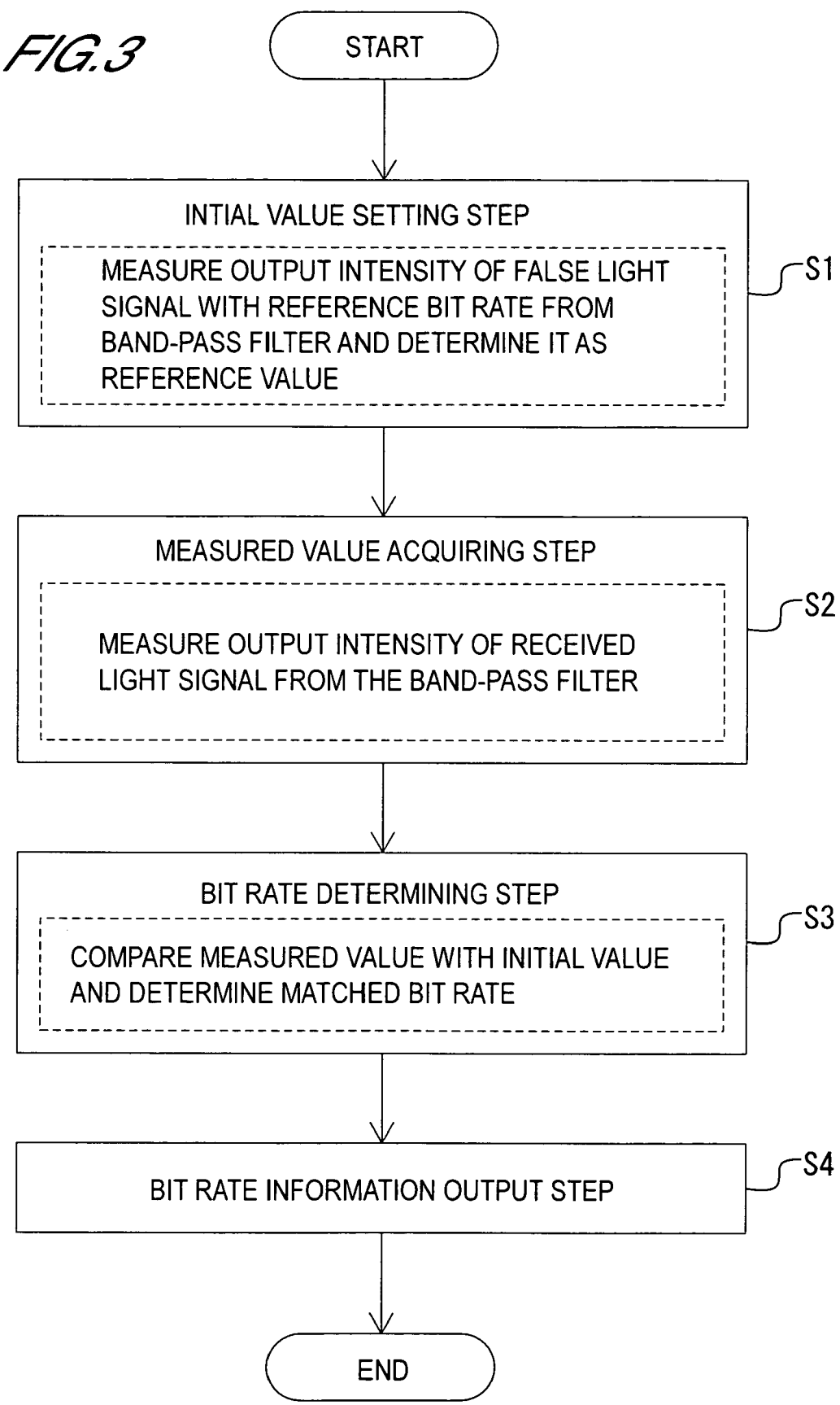
FIG. 3 is a flowchart illustrating a bit rate detecting step.
Figure 4:
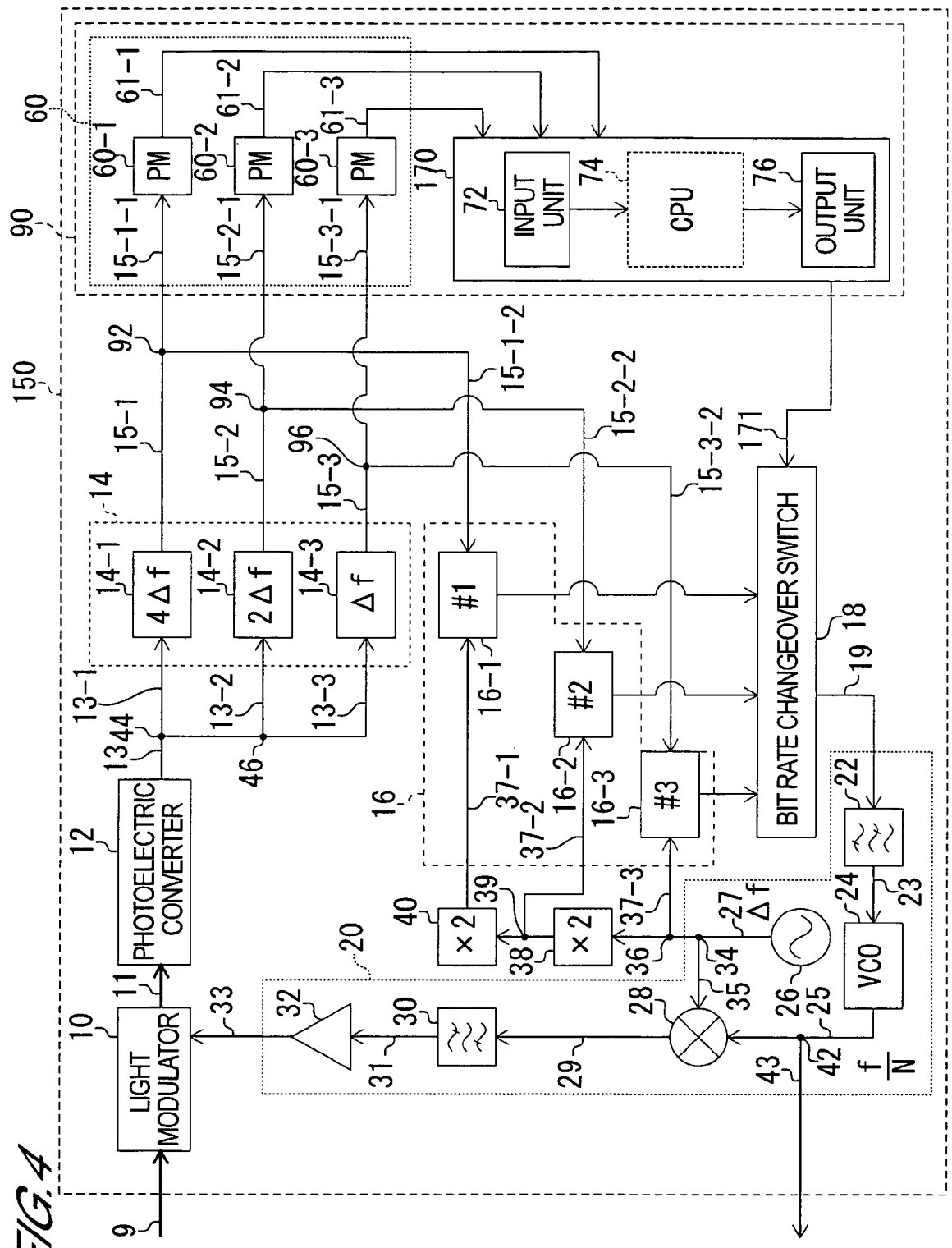
FIG. 4 is a schematic block diagram illustrating a multi-rate clock signal extracting device according to a third embodiment.

Embodiments of the present invention will be explained below with reference to FIGS. 1 to 4. FIGS. 1, 2 and 4 illustrate constitutional examples of the present invention, and only illustrates an arrangement relationship or the like of respective components for understanding of the present invention schematically, and thus the diagrams do not limit the present invention. In the following explanation, specified devices, conditions and the like are used, but the devices and conditions are only one part of the preferred example, and thus the present invention is not limited to them. The same components in the drawings are designated by the same numerals, and the overlapped explanation will not be described. Routes of a light signal such as optical fiber are shown by a thick line, and routes of an electric signal are shown by a thin line. Numbers and symbols given to the thick lines and thin lines indicate a light signal and an electric signal, respectively.

In the following explanation, for convenience, a bit rate of a light signal to be received is any one of 160 Gbit/s, 80 Gbit/s and 40 Gbit/s, and a corresponding bit rate frequency is designated by f. The bit rate is not, however, limited to the following explanation, and thus the following explanation is clearly established.

First Embodiment

A configuration of a multi-rate clock signal extracting device and its operating principle according to the first embodiment of the present invention will be explained below with reference to FIG. 1. FIG. 1 is a schematic block diagram illustrating the multi-rate clock signal extracting device according to the first embodiment. The multi-rate clock signal extracting device 50 of the present invention includes a light modulator 10, a photoelectric converter 12, a band-pass filter unit 14, a phase comparison unit 16, a bit rate changeover switch 18, and a modulating electric signal generator 20.

The light modulator 10 modulates a light signal 9 according to a modulating electric signal 33 to be supplied so as to be output as a modulated light signal 11. The modulating electric signal 33 is generated by the modulating electric signal generating unit 20 provided in the multi-rate clock signal extracting device. The modulating electric signal 33 is a mixing signal of an electric signal with frequency $f/(2^{j-1})$ and an electric signal with frequency $\Delta f$. The frequency $f/(2^{j-1})$ is $1/(2^{j-1})$ (j is an integer of not less than 1) of the maximum bit rate frequency f of a signal to be received as mentioned later. As the light modulator 10, for example, an electro absorption modulator (EAM) can be used.

In the explanation here, the bit rate of a light signal to be received is any one of 160 Gbit/s, 80 Gbit/s, and 40 Gbit/s. Thus, this corresponds to the case where f=160 GHz and j=1, 2 or 3. That is, the maximum bit rate which is assumed in the design of the multi-rate clock signal extracting device according to the first embodiment is 160 Gbit/s. $\Delta f$ is called an offset frequency whose value is set to 0.25 GHz which is sufficiently smaller than 40 GHz.

The modulated light signal 11 is converted into a first electric signal 13 by the photoelectric converter 12 so as to be sent to the band-pass filter unit 14. The band-pass filter unit 14 is configured of band-pass filters 14-1, 14-2, and 14-3. The first electric signal 13 is branched into first electric signals 13-1, 13-2, and 13-3 by power branching devices 44 and 46, they are, then, input into the band-pass filters 14-1, 14-2, and 14-3 whose passing center frequencies are $4\Delta f$, $2\Delta f$, and $\Delta f$, respectively.

Second electric signals 15-1, 15-2, and 15-3 whose frequencies are $4\Delta f$, $2\Delta f$, and $\Delta f$ are output from the band-pass filters 14-1, 14-2, and 14-3, respectively. The second electric signals 15-1, 15-2, and 15-3 compose a second electric signal group. The band-pass filter unit 14 includes j band-pass filters for extracting j electric signal components of a frequency $(2^{n-1}) \times \Delta f$ (n is a positive integer from 1 to j) from the first electric signal and outputting the components as the second electric signal group in parallel. In the first embodiment, however, this corresponds to the case where j=3.

The second electric signal group is input into the phase comparison unit 16. The phase comparison unit 16 includes a first phase comparator 16-1, a second phase comparator 16-2 and a third phase comparator 16-3. The second electric signals 15-1, 15-2, and 15-3 composing the second electric signal group are input into the first phase comparator 16-1, the second phase comparator 16-2, and the third phase comparator 16-3 composing the phase comparison unit 16, respectively. On the other hand, a third electric signal group, mentioned later, is input into the phase comparison unit 16. Third electric signals 37-1, 37-2, and 37-3 composing the third electric signal group are input into the first phase comparator 16-1, the second phase comparator 16-2, and the third phase comparator 16-3, respectively.

The third electric signals 37-1, 37-2, and 37-3 are generated based on a reference signal 27 provided in the modulating electric signal generating unit 20 as mentioned later. A frequency of the reference signal 27 is $\Delta f$ which is equal to the offset frequency. The third electric signal 37-1 is output as an electric signal with frequency $4\Delta f$ obtained in such a manner that the reference signal 27 is input into a doubler 38 via power branching devices 34 and 36 so as to be doubled and is, further, input into a doubler 40 via a power branching device 39 so as to be finally quadrupled. The third electric signal 37-2 is output in such a manner that the reference signal 27 is input into the doubler 38 via the power branching devices 34 and 36 so as to be doubled and be output as an electric signal with frequency $2\Delta f$ via the power branching device 39. The third electric signal 37-3 is an electric signal obtained by branching the power of the reference signal 27 by means of the power branching devices 34 and 36.

In the first phase comparator 16-1, therefore, the second electric signal 15-1 and the third electric signal 37-1 are input and a fourth electric signal 17-1 whose voltage is proportional to a phase difference therebetween is output. In the second comparator 16-2, the second electric signal 15-2 and the third electric signal 37-2 are input, and a fourth electric signal 17-2 whose voltage is proportional to a phase difference therebetween is output. In the third phase comparator 16-3, the second electric signal 15-3 and the third electric signal 37-3 are input, and a fourth electric signal 17-3 whose voltage is proportional to a phase difference therebetween is output. That is, the phase comparison unit 16 outputs the fourth electric signals 17-1, 17-2, and 17-3 as a fourth electric signal group in parallel.

The above operation will be generally explained as follows. The phase comparison unit 16 compares the phases of electric signals with equal frequency in the second electric signal group with frequency $(2^{n-1}) \times \Delta f$ and the third electric signal group. The third electric signal group has j frequencies $(2^{n-1}) \times \Delta f$ generated in such a manner that the reference signal with frequency $\Delta f$ generated by a reference signal generator is multiplied by $2^{n-1}$. The group of j difference components is output as the fourth electric signal group in parallel. Since n is a positive integer from 1 to j, the phase comparison unit 16 in the first embodiment corresponds to the case where j=3.

The number of stages of the band-pass filters provided in the band-pass filter unit 14 is configured to match the number of the phase comparators provided in the phase comparison unit 16.

The fourth electric signal group is input into the bit rate changeover switch 18. The bit rate changeover switch 18 selects an electric signal corresponding to a bit rate of the light signal 9 to be received, and outputs it as the electric signal 19 to the modulating electric signal generating unit 20. The modulating electric signal generating unit 20 firstly generates a modulating electric signal 33 based on the electric signal 19 so as to output it to the light modulator 10, and secondly outputs a clock signal 43 to the outside as mentioned later. The modulating electric signal 33 is supplied to the light modulator 10, and a phase locked loop (PLL) circuit is configured in the multi-rate clock signal extracting device 50. The light modulator 10, the photoelectric converter 12, the band-pass filter unit 14, the phase comparison unit 16, and the modulating electric signal generating unit 20 cooperate with one another so that PLL is realized. This will be mentioned later.

The modulating electric signal generating unit 20 is composed of a loop filter 22, a reference clock signal generator 24, a reference signal generator 26, a mixer 28, a band-pass filter 30, and an amplifier 32.

The loop filter 22 has a function for smoothing the fourth electric signal (fourth electric signal 19 output from the bit rate changeover switch 18) and converting it into a fifth electric signal 23 so as to output it. For example, a lag-lead filter or the like can be used. The reference clock signal generator 24 inputs the fifth electric signal 23 therein, and generates a reference clock signal 25 with frequency $f/(2^{j-1})$ corresponding to the minimum bit rate receivable as the bit rate of a light signal. As the reference clock signal generator 24, a voltage controlled oscillator (VCO), for example, can be used.

The bit rate of a light signal to be received is any one of 160 Gbit/s, 80 Gbit/s, and 40 Gbit/s. The receivable maximum bit rate frequency f of a light signal is, therefore, 160 GHz, and the frequency $f/(2^{j-1})$ corresponding to the receivable minimum bit rate is 40 GHz (j=3). The parameter j represents how many types of light signals with different bit rates can be received at a maximum. In this case, since the bit rates of the receivable light signals are 160 Gbit/s, 80 Gbit/s, and 40 Gbit/s, namely, three kinds, j=3.

In the multi-rate clock signal extracting method and the device for realizing the method of the present invention, the type of the bit rates of the receivable light signals is limited to f, f/2, f/2², f/2³, . . . in the case where the maximum bit rate frequency of the receivable light signal is f. The frequency corresponding to the receivable minimum bit rate is, therefore, $f/(2^{j-1})$.

The frequency of a clock signal to be extracted is a frequency $f/(2^{j-1})$ according to the minimum bit rate of the receivable light signal regardless of the bit rate of the receivable light signal. In the case where the bit rate of a light signal to be received is any one of 160 Gbit/s, 80 Gbit/s, and 40 Gbit/s, the frequency of the clock signal to be extracted is $f/(2^{j-1})$, namely, 40 GHz (j=3).

The reference clock signal 25 is divided into two by the power branching device 42. One of them is fetched to the outside as a clock signal 43 to be extracted from the multi-rate clock signal extracting device 50 of the present invention, and the other one is supplied to the mixer 28.

The reference signal generator 26 generates the reference signal 27 with frequency $\Delta f$ equal to the offset frequency so as to supply it to the mixer 28 and supplies it as an input signal to the phase comparison unit 16. The mixer 28 mixes the reference clock signal 25 with the reference signal 27, and outputs a mixing electric signal 29 as a sum frequency signal or a difference frequency signal between both the frequencies. The mixing electric signal 29 is filtered by the band-pass filter 30 so as to be output as a modulating electric signal 31 of an electric signal component whose frequency is $((f/(2^{j-1})) - \Delta f)$. Since this corresponds to the case where j=3, the frequency $((f/(2^{j-1})) - \Delta f)$ of the modulating electric signal 31 is such that $((f(2^{3-1})) - \Delta f) = ((f/4) - \Delta f)$. Since f=160 GHz, $((f/4) - \Delta f) = (40 - \Delta f)$ GHz.

A difference frequency signal out of the mixing signal is filtered to be used here, but when a sum frequency signal is filtered to be used, the similar effect is obtained.

When the intensity of the modulating electric signal 31 is not sufficient for driving the light modulator 10, it is desirable that the modulating electric signal 31 is amplified by the amplifier 32 so as to be supplied as the modulating electric signal 33 to the light modulator 10. When the intensity of the modulating electric signal 31 is sufficient for driving the light modulator 10, the amplifier 32 is not necessary.

(PLL Operation)

An explanation is given as to the case where the light modulator 10, photoelectric converter 12, the band-pass filter unit 14, the phase comparison unit 16, and the modulating electric signal generating unit 20 cooperate so that a PLL operation is realized.

The received light signal 9 is input into the light modulator 10 composing the multi-rate clock signal extracting device 50. The modulating electric signal 33 (or the modulating electric signal 31, but hereinafter explained as the modulating electric signal 33) is input into the light modulator 10, and the light signal 9 is modulated by the modulating electric signal 33. The modulating electric signal 33 with frequency $(40 - \Delta f)$ GHz to be input into the light modulator 10 has an accurate sine wave. Since, however, the light signal output to be modulated has an approximately rectangular pulse shape, the light signal output becomes a signal which includes the sine wave with frequency obtained by multiplying $(40 - \Delta f)$ GHz by N (N is an integer of 1 or more) as a Fourier component.

In the following description, when the light signal output has a pulse shape, it will not be mentioned that the light signal output includes the Fourier component within a range where a disturbance does not occur, and the frequency value of a main frequency component is occasionally expressed as a representative value. In the electric signal such as the first electric signal to be explained, even in the case where its time waveform is not an accurate sine wave and includes a lot of Fourier components, the explanation will not be referred to the Fourier components, and the frequency value of the main frequency component would be occasionally expressed as a representative value.

The case where EAM is used as the light modulator 10 is assumed, and its operation is explained. When the light signal 9 as input light to EAM propagates through an optical waveguide provided in EAM, an absorption coefficient of the optical waveguide fluctuates according to the frequency of the modulating electric signal 33 as the input electric signal to EAM. That is, the input light (light signal 19) which propagates through the optical waveguide provided into the light modulator 10 is modulated by the frequency $(40-\Delta f)$ GHz. $\Delta f$ is the frequency value which is sufficiently smaller than 40 GHz, and is set to, for example, 0.25 GHz.

For convenience of the explanation, the light modulator 10 is occasionally called a transmission window of F Hz after a phenomenon such that the input light becomes transparent or opaque according to the frequency F Hz of the electric signal to be input into the light modulator 10. That is, since the light modulator 10 becomes transparent or opaque according to the modulating electric signal 33 with frequency $(40-\Delta f)$ GHz, the transmission window has frequency of $(40-\Delta f)$ GHz.

Light signal 9 is input into the light modulator 10, and only its component which can pass through the transmission window of $(40-\Delta f)$ GHz is filtered to be output as the modulated light signal 11. That is, the light signal 9 is input into the light modulator 10, and is modulated by the modulating electric signal with frequency $(40-\Delta f)$ GHz obtained by mixing the reference clock signal 25 with frequency of $f/(2^{j-1})$ $(=160/(2^{3-1})=160/4=40$ GHz) and the reference signal 27 with frequency $\Delta f$ equal to the offset frequency so as to be output as the modulated light signal 11. As a result, the modulated light signal 11 includes a frequency component which is obtained by multiplying $(40-\Delta f)$ GHz by $(2^{n-1})$, a component which is obtained by multiplying $\Delta f$ by $(2^{n-1})$ and the like as the Fourier frequency components.

The modulated light signal 11 is input into the light modulator 12 for converting a light signal into an electric signal, and is output as the first electric signal 13. The first electric signal 13 is divided into three signals, namely, the first electric signals 13-1, 13-2, and 13-3 as mentioned above. The three first electric signals are input into the band-pass filter unit 14 configured of the band-pass filters 14-1, 14-2 and 14-3. The second electric signals 15-1, 15-2, and 15-3 whose frequencies are $4\Delta f$, $2\Delta f$, and $\Delta f$ are output from the band-pass filters 14-1, 14-2, and 14-3, respectively. The second electric signals 15-1, 15-2, and 15-3 compose the second electric signal group.

That is, the band-pass filter 14-1 whose central frequency in a pass band is $4\Delta f$ which is four times as high as $\Delta f$ filters only the frequency component of $4\Delta f$ (main Fourier frequency component) of the frequency components in the first electric signal 13-1. The second electric signal 15-1 with frequency of $4\Delta f$ is output from the band-pass filter 14-1. Similarly, only the frequency components of $2\Delta f$ and $\Delta f$ (main Fourier frequency components) in the first electric signals 13-2 and 13-3 are filtered, and the second electric signals 15-2 and 15-3 with frequencies of $2\Delta f$ and $\Delta f$ are output.

The second electric signal group is input into the phase comparison unit 16. The phase comparison unit 16 compares the phase of the second electric signal group with the phase of the third electric signal group. The third electric signal 37-1 with frequency $4\Delta f$ is generated by multiplying the reference signal 27 with frequency $\Delta f$ output from the reference signal generator 26 by 4. The third electric signal 37-2 with frequency $2\Delta f$ is obtained by branching the electric signal generated by multiplying the reference signal 27 with frequency $\Delta f$ output from the reference signal generator 26 by 2. The third electric signal 37-3 with frequency $\Delta f$ is obtained by dividing the reference signal 27 with frequency $\Delta f$ output from the reference signal generator 26.

When the phase of the second electric signal 15-1 matches the phase of the third electric signal 37-1, the fourth electric signal 17-1 output to the first phase comparator 16-1 becomes 0 V. When a phase difference is present between the phases, the voltage of the fourth electric signal 17-1 becomes large in proportion to the difference. The similar result is applied also to a relationship between the second electric signal 15-2 and the third electric signal 37-2 and a relationship between the second electric signal 15-3 and the third electric signal 37-3. When both the phases match, the fourth electric signals 17-2 and 17-3 to be output to the second phase comparator 16-2 and the third phase comparator 16-3, respectively, become 0 V. When the phase difference is present, the voltages of the fourth electric signals 17-2 and 17-3 become large in proportion to the difference.

The fourth electric signal group (fourth electric signals 17-1, 17-2 and 17-3) is input into the bit rate changeover switch 18, and any one of the fourth electric signals 17-1, 17-2, and 17-3 is selected according to the bit rate of the received light signal 9 so as to be output as the electric signal 19.

In the case where the assumed bit rate of the received light signal 9 is maximum, this case corresponds to a fourth electric signal which is output by comparing the phases of the electric signals with frequency $(2^{j-1}) \times \Delta f$ of the electric signals composing the second and third electric signal groups. In the case where the bit rate of the received light signal 9 is ½ of the assumed maximum bit rate, this case corresponds to a fourth electric signal which is output by comparing the phases of the electric signals with frequency $(2^{j-2}) \times \Delta f$ of the electric signals composing the second and third electric signal groups.

In the first embodiment, the assumed maximum bit rate is 160 Gbit/s, and j=3 is the case. For this reason, the frequencies $(2^{j-1}) \times \Delta f$ and $(2^{j-2}) \times \Delta f$ are $4\Delta f$ and $2\Delta f$, respectively.

In the case where the bit rate of the received light signal is $\frac{1}{2}^{j-k}$ of the assumed maximum bit rate, this case corresponds to the fourth electric signal which is output by comparing the phases of the electric signals whose frequencies are $(2^{k-1}) \times \Delta f$ (k is a positive integer in a range from 1 to j) of the electric signals composing the second and third electric signal groups.

For example, the assumed maximum bit rate is 160 Gbit/s, and the bit rate of the receivable light signal is 160 Gbit/s, 80 Gbit/s, and 40 Gbit/s, namely, three kinds of bit rates (j=3). This case will be explained as an example as follows. In the case where the bit rate of the received light signal is ½ ($\frac{1}{2}^{j-k}=2^{3-2}$, k=2) with respect to the assumed maximum bit rate (f=160 Gbit/s) (in the case where the bit rate is 80 Gbit/s), this corresponds to the fourth electric signal which is output by comparing the phases of the electric signals whose frequencies are $(2^{k-1}) \times \Delta f$ $(=2^{2-1} \times \Delta f = 2\Delta f)$ of the electric signals composing the second and third electric signal groups. Further, in the case where the bit rate of the received light signal is $\frac{1}{2}^2$ ($\frac{1}{2}^{j-k}=2^{3-1}$, k=1) with respect to the assumed maximum bit rate (f=160 Gbit/s) (in the case where the bit rate is 40

Gbit/s), this corresponds to the fourth electric signal which is output by comparing the phases of the electric signals whose frequencies are $(2^{k-1})\times\Delta f$ $(=2^{1-1}\times\Delta f=\Delta f)$ of the electric signals composing the second and third electric signal groups.

Needles to say, in the case where the bit rate of the received light signal is equal to the assumed maximum value (f=160 Gbit/s), namely, $\frac{1}{2^0}$ ($\frac{1}{2^{j-k}}=2^{3-3}$, k=3) (in the case where the bit rate is 160 Gbit/s), this corresponds to the fourth electric signal which is output by comparing the phases of the electric signals whose frequencies are $(2^{k-1})\times\Delta f$ $(=2^{3-1}\times\Delta f=4\Delta f)$ of the electric signals composing the second and third electric signal groups.

In the case where the bit rate of the light signal to be received is $\frac{1}{2^{j-k}}$ of the maximum bit rate assumed in the multi-rate clock signal extracting method of the first invention in advance, the bit rate changeover switch is set so that the fourth electric signal which is output by comparing the corresponding second and third electric signals whose frequencies are $(2^{k-1})\times\Delta f$ is selected. As a result, a clock signal can be extracted according to the bit rate which is notified prior to the start of communication in advance. The first embodiment correspond to the case where j=3, k=1, 2 and 3. That is, k=1 corresponds to that the bit rate of the received light signal is 40 Gbit/s, k=2 corresponds to that the bit rate of the received light signal is 80 Gbit/s, and k=3 corresponds to that the bit rate of the received light signal is 160 Gbit/s.

The bit rate changeover switch 18 selects any one of the fourth electric signals 17-1, 17-2, and 17-3 to be input in parallel so as to output the selected one as the electric signal 19 to the modulating electric signal generating unit 20. That is, corresponding one of the fourth electric signals 17-1, 17-2, and 17-3 is selected based on the bit rate notified via the management plane in advance prior to the start of communication, and it is output as the electric signal 19 to the modulating electric signal generating unit 20. This selecting operation may be performed manually by a manager of the multi-rate clock signal extracting device 50 or by any mechanic or electric unit.

The electric signal 19 is input into the loop filter 22 and is output as a fifth electric signal 23 with intensity smoothed temporarily and is input into the reference clock signal generator 24.

The reference clock signal generator 24 has a function for outputting a sixth electric signal (reference clock signal) 25 as an electric signal with frequency proportional to the voltage of the fifth electric signal 23 to be input. For this reason, the frequency of the sixth electric signal (reference clock signal) 25 to be output from the reference clock signal generator 24 changes so that the phase of the second electric signal group extracted from the light signal 9 matches the phase of the third electric signal group. The reason for this will be explained below.

If the frequency to be output is set to 40 GHz at the time when the fifth electric signal 23 is 0 V, in the case where the phase of the second electric signal group matches with the phase of the third electric signal group, the reference clock signal generator 24 outputs the sixth electric signal (reference clock signal) 25 with frequency of 40 GHz. That is, in order to set the values of the signals of the fourth electric signal group to 0 V, it is necessary that a component which is output from the modulated light signal 11 and depends on the difference frequency component $\Delta f$ synchronizes with the reference signal 27 output from the reference signal generator 26.

The second electric signal group has signals which are obtained by filtering only a frequency component of $(2^{n-1})\times\Delta f$ in the frequency components of the first electric signal 13 (main Fourier frequency component). The first electric signal 13 is a signal which is obtained by inputting the modulated light signal 11 into the photoelectric converter 12 and converting it into an electric signal. That is, the second electric signal 15-1 is a signal which is obtained by filtering only a frequency component of $4\Delta f$, the second electric signal 15-2 is a signal obtained by filtering only a frequency component of $2\Delta f$, and the second electric signal 15-3 is a signal which is obtained by filtering only a frequency component of $\Delta f$.

The modulated light signal 11 is a signal which is obtained by a modulating electric signal 33 so as to be output from the light modulator 10. The modulating electric signal 33 is obtained by mixing the low-frequency component $\Delta f$ with the frequency which is $1/(2^{j-1})$ of the bit rate frequency f of the light signal 9 (j is an integer of 1 or more). The synchronization with the phase of the second electric signal group, therefore, represents the synchronization with the phase of the electric frequency being $1/(2^{j-1})$ of the bit rate frequency f of the light signal 9.

The sixth electric signal (reference clock signal) 25 to be output from the reference clock signal generator 24 is branched by the power branching device 42. One of the branched signals is input as a returned signal of PLL into the mixer 28. The other signal is output as an extracted clock signal 43 from the multi-rate clock signal extracting device 50.

The mixer 28 inputs the sixth electric signal (reference clock signal) 25 to be output from the reference clock signal generator 24 and a seventh electric signal 35 as an electric signal with frequency $\Delta f$ to be output from the reference signal generator 26 via the power branching device 34 thereinto. As a result, an eighth electric signal (mixing electric signal) 29 obtained by synthesizing a plurality of electric signal components with frequency $40\pm m\Delta f$) is output from the mixer 28. m is an integer of 1 or more, and independent from the above-mentioned integer n.

The eighth electric signal 29 is input into the band-pass filter 30 whose center frequency in the pass band is $(40-\Delta f)$, and only the electric signal with frequency $(40-\Delta f)$ is filtered out of a plurality of the frequency components of the eight electric signal 29 so a to be output as a ninth electric signal (modulating electric signal) 31. The ninth electric signal 31 as the electric signal with frequency $(40-\Delta f)$ is amplified by the amplifier 32 and is converted into a tenth electric signal 33 so a to be input into the light modulator 10. A difference frequency $(40-\Delta f)$ is selected as the frequency of the ninth electric signal, but a sum frequency $(40+\Delta f)$ may be selected as the frequency of the ninth electric signal.

The above explanation will be clarified as follows. At the light modulating step, a component $(2^{n-1})\times\Delta f$ is extracted. This component is the difference frequency between a component $2^{n-1}(40-\Delta f)$ obtained by multiplying $(40-\Delta f)$ included in a tenth electric signal 33 as the control signal input into the light modulator 10 by $2^{n-1}$ and a component $(2^{n-1})\times(f/2^{j-1})$ of the RZ-coded light signal 9. This is because the first embodiment corresponds to the case where f=160 GHz and j=3, and thus $f/2^{j-1}$ corresponds to $160/2^{3-1}$, namely, 40 GHz, so that $(2^{n-1})\times(f/2^{j-1})-2^{n-1}(40-\Delta f)=(2^{n-1})\times 40-2^{n-1}(40-\Delta f)=(2^{n-1})\times\Delta f$.

That is, the modulating light signal 11 output from the light modulator 10 includes the modulated component $(2^{n-1})\times\Delta f$. The component $(2^{n-1})\times\Delta f$ is made to be the second electric signal group with frequency $(2^{n-1})\times\Delta f$ by the light modulator 12 and the band-pass filter unit 14 so as to be input into the phase comparison unit 16.

On the other hand, the third electric signal group with frequency $(2^{n-1})\times\Delta f$ is also input into the phase comparison unit 16. In the phase comparison unit 16, the components of an electric circuit in the multi-rate clock signal extracting device 50 cooperates so that the phase of the second electric signal group with frequency $(2^{n-1}) \times \Delta f$ matches the phase of the third electric signal group with frequency $(2^{n-1}) \times \Delta f$. As a result, a PLL circuit is formed. The PLL circuit synchronizes the phase of the clock signal included in the light signal 9 with the phase of the clock signal 43 extracted from the multi-rate clock signal extracting device 50. Prior to the start of communication, therefore, the clock signal can be extracted according to the bit rate notified via the management plane in advance.

Second Embodiment

A constitution and an operating principle of a bit rate detecting device according to a second embodiment of the present invention will be explained with reference to FIG. 2. FIG. 2 is a schematic block diagram for explaining the bit rate detecting device and its operation according to the second embodiment. The bit rate detecting device of the present invention includes the light modulator 110, the photoelectric converter 112, the band-pass filter unit 114, the modulating electric signal generating unit 120, an intensity detecting unit 60, and a bit rate detecting unit 70. For convenience of the later explanation, the device which includes the intensity detecting unit 60 and the bit rate detecting unit 70 is occasionally called the bit rate detecting device 90.

The light modulator 110 modulates the light signal 9 according to a modulating electric signal 133 as a mixing signal of an electric signal with frequency which is $f/(2^{j-1})$ of the bit rate frequency f of the received light signal 9 (j is an integer of 1 or more) and an electric signal with frequency $\Delta f$ so as to be output it as a modulated light signal 111. As mentioned later, the electric signal with frequency $f/(2^{j-1})$ is supplied from the reference clock signal generator 124, and the electric signal with frequency $\Delta f$ is supplied from the reference signal generator 126.

The modulated light signal 111 is input into the light modulator 112 and is converted into the first electric signal 113 so as to be output. The modulated light signal 111 and the first electric signal 113 include j electric signal components with frequency $(2^{n-1}) \times \Delta f$ (n is a positive integer from 1 to j).

The band-pass filter unit 114 includes j band-pass filters which are used for extracting the j electric signal components with frequency $(2^{n-1}) \times \Delta f$ (n is a positive integer from 1 to j) from the first electric signal 113 so as to output the components in parallel as the second electric signal group. In the second embodiment, since j=3, three electric signal components with frequencies $(2^{n-1}) \times \Delta f = 2^{3-1} \Delta f = 4 \Delta f$, $(2^{n-1}) \times \Delta f = 2^{2-1} \Delta f = 2 \Delta f$, and $(2^{n-1}) \times \Delta f = 2^{1-1} \Delta f = \Delta f$ in the first electric signal 113 are output as the second electric signal group in parallel. The frequencies of the second electric signals 115-1, 115-2, and 115-3 composing the second electric signal group are $4 \Delta f$, $2 \Delta f$ and $\Delta f$.

The intensity detecting unit 60 is configured of j intensity detectors for detecting the intensity of the j second electric signals composing the second electric signal group. That is, the intensity detecting unit 60 is configured of an intensity detector 60-1 for detecting the intensity of the second electric signal 115-1, an intensity detector 60-2 for detecting the intensity of the second electric signal 115-2, and an intensity detector 60-3 for detecting the intensity of the second electric signal 115-3.

The bit rate detecting unit 70 includes an input unit 72, a central processing unit (CPU) 74, and an output unit 76. The CPU 74 is configured of a control unit 78, a storage unit 80, an input power comparison unit 82, and the output signal generating unit 84. The bit rate detecting unit 70 has the following function whose details will be mentioned later. That is, j reference values measured for the light signals with j bit rates assumed in advance are stored in the storage unit 80 in advance. The intensity values of the j second electric signals output at the band-pass step executed by the band-pass filter unit 114 are captured so as to be compared with the j reference values stored in the storage unit 80. The bit rates corresponding to the matched reference values are determined to be detected as the bit rates of the received light signals. The bit rate of the light signal received on the receiver side can be, therefore detected.

The modulating electric signal generating unit 120 is configured of the reference clock signal generator 124, the reference signal generator 126, the mixer 128, and the band-pass filter 130. It is preferable that an amplifier 132 is provided as needed.

The reference clock signal generator 124 generates a reference clock signal 125 with frequency $f/(2^{j-1})$ corresponding to the minimum bit rate receivable as the bit rate of the light signal. In the second embodiment, since it is assumed that f=160 GHz and j=3, the frequency $f/(2^{j-1})$ corresponding to the minimum bit rate receivable as the bit rate of the light signal becomes such that $160/(2^{3-1})$ GHz=160/4 GHz=40 GHz.

The reference signal generator 126 generates a reference signal 127 with frequency $\Delta f$. The frequency $\Delta f$ indicates an offset frequency, and it is set to 0.25 GHz.

The mixer 128 mixes the reference clock signal 125 with the reference signal 127 so as to output a mixing electric signal 129 as a sum frequency signal or a difference frequency signal of them. The band pass filter 130 filters the mixing electric signal 129 so as to output a modulating electric signal 131 as an electric signal component with frequency $((f/(2^{j-1})) - \Delta f)$. In the second embodiment, since it is assumed that f=160 GHz and j=3, the frequency $((f/(2^{j-1})) - \Delta f)$ of the modulating electric signal 131 becomes such that $((f/(2^{j-1})) - \Delta f) = ((160/(2^{3-1})) - \Delta f)$ GHz = $(40 - \Delta f)$ GHz.

(Bit Rate Detecting Step)

The bit rate detecting step to be executed by the bit rate detecting unit 70 will be explained with reference to the flowcharts in FIGS. 2 and 3. FIG. 3 is a flowchart of the bit rate detecting step. The bit rate detecting step includes S1: an initial value set step, S2: a measured value acquiring step, S3: a bit rate determining step, and S4: a bit rate information output step.

At the initial value set step (S1), as to the light signals (hereinafter, occasionally "false light signal") with j bit rates (hereinafter, occasionally "reference bit rate") which are assumed to be received in advance, the output intensities of the second electric signal group to be output from the band-pass filter unit 114 are measured, and these values are stored as the reference values in the storage unit 80.

The explanation is given in the case where j=3 and the three kinds of light signals of 160 Gbit/s, 80 Gbit/s, and 40 Gbit/s are received. The frequencies of the second electric signals 115-1, 115-2, and 115-3 composing the second electric signal group to be output from the band-pass filter unit 114 are $4 \Delta f$, $2 \Delta f$, and $\Delta f$, respectively.

The intensity detector 60-1 composing the intensity detecting unit 60 measures the output intensity of false light signal whose bit rate is 160 Gbit/s from the band-pass filter 114-1 composing the band-pass filter unit 114. The measured result is output as an output signal 61-1 and is input into the bit rate detecting unit 70. A light pulse train of repeated frequencies equal to the reference bit rate, PRBS (Pseudo Random Binary Sequence) signal or the like may be used as the false light signal.

When the false light signal whose bit rate is 160 Gbit/s is input into the light modulator 110, the intensity value of the output signal 61-1 to be output from the intensity detector 60-1 composing the intensity detecting unit 60 is stored as the reference value for the light signal with bit rate of 160 Gbit/s in the storage unit 80. Similarly, when the false light signals whose bit rates are 80 Gbit/s and 40 Gbit/s are input into the light modulator 110, the intensity values of the output signals 61-2 and the output signals 61-3 to be acquired are stored as the reference values for the light signals with bit rates of 80 Gbit/s and 40 Gbit/s in the storage unit 80. The intensity values (reference values) of the output signals 61-1, 61-2, and 61-3 are related with the bit rates of each output signal one by one so as to be stored in the storage unit 80.

The method of storing the reference signals in the storage unit 80 is arbitrary. That is, for example, the reference signals are acquired in advance experimentally, and the values of the output signals 61-1, 61-2, and 61-3 obtained as a result are manually input into the storage unit 80 by using an operating terminal (not shown) for operating the bit rate detecting unit 70.

At the measured value acquiring step (S2), the output intensity of the received light signal from the band-pass filter is measured. That is, the light signal 9 whose bit rate is unknown is input into the light modulator 110, the intensities of the second electric signals 115-1, 115-2, and 115-3 to be output from the band-pass filters 114-1 114-2, and 114-3 composing the band-pass filter unit 114, respectively, are measured.

The intensities of the second electric signals 115-1, 115-2, and 115-3 are measured by the intensity detectors 60-1, 60-2, and 60-3, respectively, and are output as the output signals 61-1, 61-2, and 61-3 so as to be input into the input unit 72 composing the bit rate detecting unit 70.

At the bit rate determining step (S3), the output signals 61-1, 61-2, and 61-3 as the measured values are compared with the reference values of the light signals with bit rates 160 Gbit/s, 80 Gbit/s, and 40 Gbit/s as the initial values. The matched bit rates are determined.

The output signals 61-1, 61-2, and 61-3 input into the input unit 72 are stored in the storage unit 80 as the component of the central processing unit 74, and are sent to the input power comparison unit 82. The reference values of the light signals with bit rates of 160 Gbit/s, 80 Gbit/s, and 40 Gbit/s are sequentially read from the storage unit 80 so as to be sent to the input power comparison unit 82 according to a storage information reading signal output from the control unit 78. The input power comparison unit 82 compares the output signals 61-1, 61-2, and 61-3 sent from the input unit 72 with the reference values of the light signals with bit rates of 160 Gbit/s, 80 Gbit/s, and 40 Gbit/s sent from the storage unit 80.

The concrete explanation is given below. The output signals 61-1, 61-2, and 61-3 are supplied from the input unit 72 to the input power comparison unit 82 sequentially with a constant time interval. On the other hand, while the output signal 61-1 is supplied to the input power comparison unit 82, the storage information reading signal is sent from the control unit 78 to the storage unit 80, and the reference values of the light signals with bit rates of 160 Gbit/s, 80 Gbit/s, and 40 Gbit/s are read sequentially. The reference values are sent to the input power comparison unit 82 so as to be compared with the value of the output signal 61-1. Similarly, while the output signals 61-2 and 61-3 are supplied to the input power comparison unit 82, the storage information reading signal is sent from the control unit 78 to the storage unit 80, and the reference values of the light signals with bit rate of 160 Gbit/s, 80 Gbit/s, and 40 Gbit/s are read sequentially. The reference values are sent to the input power comparison unit 82 so as to be compared with the intensity values of the output signals 61-2 and 61-3.

As a result, a combination between any one of the intensity values of the output signals 61-1, 61-2, 61-3 and the reference values of the light signals with bit rates of 160 Gbit/s, 80 Gbit/s, and 40 Gbit/s whose intensities match the most is selected, so that the bit rate is determined. For example, when the intensity value of the output signal 61-1 matches the reference value of the light signal of 160 Gbit/s, the bit rate of the light signal 9 is determined as 160 Gbit/s. Similarly, when the intensity value of the output signal 61-2 matches the reference value of the light signal of 80 Gbit/s, the bit rate of the light signal 9 is determined as 80 Gbit/s. Further, when the intensity value of the output signal 61-3 matches the reference value of the light signal of 40 Gbit/s, the bit rate of the light signal 9 is determined as 40 Gbit/s.

At the bit rate information output step (S4), the bit rate information determined at the bit rate determining step (S3) is output.

The input power comparison unit 82 compares the intensities between any one of the output signals 61-1, 61-2, 61-3 and any one of the reference values of the light signals with bit rates of 160 Gbit/s, 80 Gbit/s, 40 Gbit/s according to the timing of the storage information reading signal sent from the control unit 78 to the storage unit 80. The moment when the intensities of both the signals match also matches the timing of the storage information reading signal. As a result, since a pulse signal is sent from the power comparison unit 82 to the output signal generating unit 84 at the moment when the intensities of both signals match, the output signal generating unit 84 can acquire bit rate information based on the moment when the pulse signal is received. That is, any one of 160 Gbit/s, 80 Gbit/s, and 40 Gbit/s (bit rate information) is transmitted as the bit rate of the light signal 9 whose bit rate is unknown from the input power comparison unit 82 to the output signal generating unit 84.

The bit rate information transmitted from the input power comparison unit 82 is transmitted as the electric signal converted into the level of a voltage from the output signal generating unit 84 to the output unit 76. The electric signal is shaped to be output from the output unit 76 for convenience of another device using the bit rate information transmitted from the output signal generating unit 84. For example, when the bit rate of the light signal is 160 Gbit/s, the electric signal is output as a signal composed of three short pulses. When the bit rates of the light signals are 80 Gbit/s and 40 Gbit/s, the electric signals are output as a signal composed of two short pulses and one short pulse, respectively.

The bit rate detecting unit 70 executes the steps S1 to S4 so as to output the bit rate information of the light signal 9 whose bit rate is unknown to the outside. That is, the bit rate detecting unit 70 captures the three intensity values of the second electric signals 115-1, 115-2, and 115-3 sequentially, and compares the intensities with the reference values of the light signals with bit rates of 160 Gbit/s, 80 Gbit/s, and 40 Gbit/s stored in the storage unit 80. The combinations of the second electric signals 115-1, 115-2, 115-3 and the reference values of the light signals with bit rates of 160 Gbit/s, 80 Gbit/s, 40 Gbit/s whose intensities match each other are found, and the bit rate which matches the reference value is determined as the bit rate of the received light signal so as to be detected.

Third Embodiment

The constitution and the operating principle of a multi-rate clock signal extracting device according to a third embodiment of the present invention will be explained with reference to FIG. 4. FIG. 4 is a schematic block diagram showing the multi-rate clock signal extracting device according to the third embodiment.

The multi-rate clock signal extracting device 150 of the present invention includes the light modulator 10, the photoelectric converter 12, the band-pass filter unit 14, an intensity detecting unit 60, a bit rate detecting unit 170, the phase comparison unit 16, the bit rate changeover switch 18, and the modulating electric signal generating unit 20. Since the light modulator 10, the photoelectric converter 12, the band-pass filter unit 14, the phase comparison unit 16, the bit rate changeover switch 18, and the modulating electric signal generating unit 20 are the same as those of the multi-rate clock signal extracting unit 50 of the first embodiment, the explanation thereof is omitted. Since the constitution of the modulating electric signal generating unit 20 is also the same as that of the multi-rate clock signal extracting device 50 of the first embodiment, the explanation thereof will not be described.

A difference from the multi-rate clock signal extracting device 50 is that the multi-rate clock signal extracting device 150 further includes the intensity detecting unit 60 and the bit rate detecting unit 170. For this reason, in the multi-rate clock signal extracting device 50 of the first embodiment, after a bit rate of a light signal to be received in advance is notified, the bit rate changeover switch should be operated according to the bit rate. However, in the case where the intensity detecting unit 60 and the bit rate detecting unit 170 are provided, even if the bit rate of the light signal to be received in advance is not notified, the bit rate of the light signal is detected from the light signal to be received, and the bit rate changeover switch is operated based on the bit rate so as to be capable of coping with a change in the bit rate.

Since the intensity detecting unit 60 is the same as the intensity detecting unit 60 of the bit rate detecting device 90 in the second embodiment, the explanation thereof will not be described. Although the bit rate detecting unit 170 is the same as the bit rate detecting unit 70 of the bit rate detecting device 90 of the second embodiment, there is a difference is that the output signal 171 relating to the bit rate information to be output from the bit rate detecting unit 170 is configured to be input into the bit rate changeover switch 18. The other parts are the same as those of the bit rate detecting unit 70 of the bit rate detecting device 90 in the second embodiment.

When the light signal whose bit rate is unknown is input into the multi-rate clock signal extracting device 150, the bit rate detecting device 90 determines and detects the bit rate. The result is output as the output signal 171 relating to the bit rate information from the output unit 76. The output signal 171 is composed of three or two short pulses, or one short pulse according to the 160 Gbit/s, 80 Gbit/s, or 40 Gbit/s which is the bit rate of the received light signal, respectively, for example.

Since the bit rate changeover switch 18 is switched by the output signal 171 according to the bit rate of the received light signal, the light modulator 10, the photoelectric converter 12, the band-pass filter unit 14, the phase comparison unit 16, and the modulating electric signal generating unit 20 cooperate so that PLL is realized. Therefore, the bit rate of the received light signal is detected, and the clock signal can be extracted according to the bit rate.

What is claimed is:

1. A multi-rate clock signal extracting method, comprising:
   a light modulating step of modulating a receivable light signal according to a modulating electric signal obtained by mixing an electric signal with frequency $f/(2^{j-1})$ being $1/(2^{j-1})$ of a maximum bit rate frequency f of said light signal (j is an integer of 1 or more) and an electric signal with frequency $\Delta f$ so as to output a modulated light signal;
   a photoelectric converting step of converting said modulated light signal into a first electric signal;
   a first band-pass step of extracting j electric signal components with frequencies $(2^{n-1}) \times \Delta f$ (n is a positive integer from 1 to j) from said first electric signal so as to output the electric signal components as a second electric signal group in parallel;
   a second electric signal intensity detecting step of detecting intensities of j second electric signals composing said second electric signal group;
   a bit rate detecting step of comparing reference values as the intensity values of the j second electric signals measured for light signals with j bit rates assumed in advance with the intensity values of the j second electric signals output at said second electric signal intensity detecting step so as to find combinations of matched reference values and intensity values so as to determine and detect bit rates corresponding to the matched reference values as the bit rates of the received light signals;
   a phase comparing step of comparing phases of electric signals with equal frequencies between said second electric signal group with frequencies $(2^{n-1}) \times \Delta f$ and a third electric signal group with j frequencies $(2^{n-1}) \times \Delta f$ generated by multiplying a reference signal with frequency $\Delta f$ generated from a reference signal generator by $2^{n-1}$ so as to output a group of j difference components as a fourth electric signal group in parallel;
   a bit rate changeover step of selecting one fourth electric signal corresponding to the bit rate detected at the bit rate detecting step from said fourth electric signal group so as to output the fourth electric signal; and
   a modulating electric signal generating step of inputting said selected fourth electric signal so as to generate and output said modulating electric signal.

2. The multi-rate clock signal extracting method according to claim 1, wherein said modulating electric signal generating step comprises:
   a smoothing step of smoothing the selected fourth electric signal and converting said selected fourth electric signal into a fifth electric signal so as to output the selected fourth electric signal;
   a reference clock signal generating step of inputting said fifth electric signal so as to generate a reference clock signal with frequency $f/(2^{j-1})$ corresponding to a minimum bit rate receivable as the bit rate of said light signal;
   a reference signal generating step of generating a reference signal with frequency $\Delta f$;
   a mixing step of mixing said reference clock signal and said reference signal so as to output a mixing electric signal as a sum frequency signal or a difference frequency signal of both the frequencies of the reference clock signal and the reference signal; and a second band-pass step of filtering said mixing electric signal so as to output a modulating electric signal as any one of electric signal components with frequencies $((f/2^{j-1})+\Delta f)$ and $((f/2^{j-1})-\Delta f)$.

3. A multi-rate clock signal extracting device, comprising:
a light modulator that modulates a receivable light signal according to a modulating electric signal obtained by mixing an electric signal with frequency $f/(2^{j-1})$ being $1/(2^{j-1})$ of a maximum bit rate frequency f of said light signal (j is an integer of 1 or more) and an electric signal with frequency $\Delta f$ so as to output a modulated light signal;
a photoelectric converter that inputs said modulated light signal thereinto and converts the modulated light signal into a first electric signal so as to output the first electric signal;
a band-pass filter unit that extracts j electric signal components with frequencies $(2^{n-1}) \times \Delta f$ (n is a positive integer from 1 to j) from said first electric signal so as to output the electric signal components as a second electric signal group in parallel;
an intensity detecting unit that detects intensities of j second electric signals composing said second electric signal group; and
a bit rate detecting unit that compares reference values as the intensity values of the j second electric signals measured for light signals with j bit rates assumed in advance with the intensity values of the j second electric signals output by said intensity detecting unit and finds combinations of matched reference values and intensity values so as to determine and detect bit rates corresponding to the matched reference value as the bit rates of the received light signals;
a phase comparison unit that comprises j phase comparators for comparing phases of electric signals with equal frequencies between said second electric signal group with frequencies $(2^{n-1}) \times \Delta f$ and a third electric signal group with j frequencies $(2^{n-1}) \times \Delta f$ generated by multiplying a reference signal with frequency $\Delta f$ generated from a reference signal generator by $2^{n-1}$ so as to output a group of j difference components as a fourth electric signal group in parallel;
a bit rate changeover switch that selects one fourth electric signal corresponding to the bit rate detected at said bit rate detecting unit from said fourth electric signal group so as to output the fourth electric signal; and
a modulating electric signal generating unit that inputs said selected fourth electric signal thereinto so as to generate said modulating electric signal.

4. The multi-rate clock signal extracting device according to claim 3, wherein said modulating electric signal generating unit comprises:
a loop filter that smoothens said selected fourth electric signal and converts the fourth electric signal into a fifth electric signal so as to output the fifth electric signal;
a reference clock signal generator that inputs said fifth electric signal thereinto so as to generate a reference clock signal with frequency $f/(2^{j-1})$ corresponding to a minimum bit rate receivable as the bit rate of said light signal;
a reference signal generator that generates a reference signal with frequency $\Delta f$;
a mixer that mixes said reference clock signal and said reference signal so as to output a mixing electric signal as a sum frequency signal or a difference frequency signal of both the frequencies of the reference clock signal and the reference signal; and
a band-pass filter that filters said mixing electric signal so as to output a modulating electric signal as any one of electric signal components with frequencies $((f/2^{j-1})+\Delta f)$ and $((f/2^{j-1})-\Delta f)$.

5. The multi-rate clock signal extracting device according to claim 3, wherein said light modulator is an electric field absorption type modulator.

6. The multi-rate clock signal extracting device according to claim 4, wherein said reference clock signal generator is a voltage control type oscillator.

* * * * *